United States Patent
Quaiyum

(10) Patent No.: US 11,639,162 B2
(45) Date of Patent: May 2, 2023

(54) REDUCING BRAKING TORQUE INSTEAD OF ENGINE TORQUE TO ACCELERATE VEHICLE DURING VEHICLE HILL DESCENT CONTROL

(71) Applicant: Robert Bosch GmbH, Stuttgart (DE)

(72) Inventor: Labiba Quaiyum, Ferndale, MI (US)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 17/068,604

(22) Filed: Oct. 12, 2020

(65) Prior Publication Data
US 2021/0155214 A1    May 27, 2021

Related U.S. Application Data

(60) Provisional application No. 62/940,422, filed on Nov. 26, 2019.

(51) Int. Cl.
| | | |
|---|---|---|
| *B60T 8/74* | (2006.01) | |
| *B60T 8/52* | (2006.01) | |
| *B60W 40/105* | (2012.01) | |
| *B60W 10/18* | (2012.01) | |

(52) U.S. Cl.
CPC .............. *B60T 8/74* (2013.01); *B60T 8/52* (2013.01); *B60W 10/18* (2013.01); *B60W 40/105* (2013.01); *B60T 2201/04* (2013.01); *B60W 2540/10* (2013.01); *B60W 2710/18* (2013.01)

(58) Field of Classification Search
CPC .......... B60T 8/74; B60T 8/52; B60T 2201/04; B60W 10/18; B60W 40/105; B60W 2540/10; B60W 2710/18
See application file for complete search history.

(56) References Cited

U.S. PATENT DOCUMENTS

| | | |
|---|---|---|
| 5,997,108 A | 12/1999 | Claussen et al. |
| 6,233,514 B1 | 5/2001 | Claussen et al. |
| 6,243,640 B1 | 6/2001 | Beever |
| 6,571,768 B1 | 6/2003 | Nishiyama |
| 7,349,776 B2 | 3/2008 | Spillane et al. |
| 7,762,633 B2 | 7/2010 | Maskell et al. |

(Continued)

FOREIGN PATENT DOCUMENTS

| | | |
|---|---|---|
| GB | 2325716 A | 12/1998 |
| JP | 2020012434 A | 1/2020 |
| KR | 20100113650 A | 10/2010 |

OTHER PUBLICATIONS

United Kingdom Intellectual Property Office Search Report for Application No. GB2018529.4 dated May 5, 2021 (2 pages).

*Primary Examiner* — Truc M Do
(74) *Attorney, Agent, or Firm* — Michael Best & Friedrich LLP

(57) ABSTRACT

A vehicle hill descent control system and method for controlling a vehicle during a hill descent receives inputs from an accelerator pedal position sensor and a brake pedal sensor. The method controls the engine drivetrain system to engine idling and controls the braking control system to maintain vehicle speed by increasing braking torque to minimize or offset a vehicle speed increase due to gravity. In vehicle hill descent mode, when a vehicle user actuates the accelerator pedal, the engine idling does not change. Instead, the electronic control unit operates to decrease braking torque so the vehicle speed is increased.

20 Claims, 6 Drawing Sheets

(56) References Cited

U.S. PATENT DOCUMENTS

| | | |
|---|---|---|
| 8,332,119 B2 | 12/2012 | Bach et al. |
| 10,421,442 B2 | 9/2019 | Owen et al. |
| 2003/0200016 A1* | 10/2003 | Spillane .............. B60W 30/182 |
| | | 701/36 |
| 2007/0158151 A1* | 7/2007 | Deconti ................ F16D 65/853 |
| | | 188/264 D |
| 2007/0222289 A1 | 9/2007 | Fukuda et al. |
| 2013/0197773 A1* | 8/2013 | Shuler ................. B60W 30/146 |
| | | 701/93 |
| 2013/0304339 A1 | 11/2013 | Shattuck et al. |
| 2021/0053552 A1 | 2/2021 | Szczepaniak |

* cited by examiner

REDUCING BRAKING TORQUE INSTEAD OF ENGINE TORQUE TO ACCELERATE VEHICLE DURING VEHICLE HILL DESCENT CONTROL

RELATED APPLICATIONS

The present patent application claims the benefit of prior filed U.S. provisional patent application 62/940,422, filed on Nov. 26, 2019, the entire contents of which are hereby incorporated by reference.

BACKGROUND

This arrangement relates to a system and method for increasing speed of vehicle during hill descent without operating the vehicle engine to increase output torque therefrom.

Hill descent control for vehicles is known. U.S. Pat. No. 6,233,514 discloses providing a constant descending speed dependent upon the position of the gas pedal and upon the currently engaged gear. The method is advantageous on steep gradients wherein the braking action of the engine is no longer sufficient to decelerate the vehicle.

U.S. Pat. No. 6,571,768 discloses a vehicle deceleration force control device that adds braking force when a depressed accelerator pedal is returned. A fuel cut is also disclosed when the accelerator pedal is returned to the fully closed position.

SUMMARY

One embodiment is a vehicle hill descent control system for controlling speed of a vehicle with an engine. The vehicle hill descent control system includes an accelerator pedal position sensor for sensing position of an accelerator pedal, a braking control system, an engine drivetrain system, a brake pedal sensor, a vehicle speed and direction sensing arrangement, and an electronic control unit including an electronic processor and a memory. The electronic processor is configured to determine that the vehicle is in a vehicle hill descent mode with braking torque applied to control speed of the vehicle, and thereafter to operate the engine at idle torque and disconnect the accelerator pedal position sensor from the engine to maintain idle torque. When the accelerator pedal is actuated in the vehicle hill descent mode, the electronic processor is configured to determine a desired velocity for the vehicle corresponding to the position of the accelerator pedal, provide a control signal to the braking control system to reduce the braking torque of the vehicle to increase velocity of the vehicle, and when the desired velocity for the vehicle is obtained, maintain the braking torque at a constant value.

Another embodiment is a method for controlling speed of a vehicle with an engine. The method includes determining that the vehicle is in a vehicle hill descent mode with braking torque applied to vehicle brakes to control speed of the vehicle. When in the descent mode, the method includes operating the engine at idle torque and disconnecting the accelerator pedal position sensor from the engine to maintain idle torque. When the accelerator pedal is actuated in the hill descent mode, the method includes determining a desired velocity for the vehicle corresponding to the position of the accelerator pedal, providing a control signal to a braking control system to reduce the braking torque of the vehicle to increase velocity of the vehicle, and when the desired velocity for the vehicle is obtained, maintaining the braking torque at a constant value.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
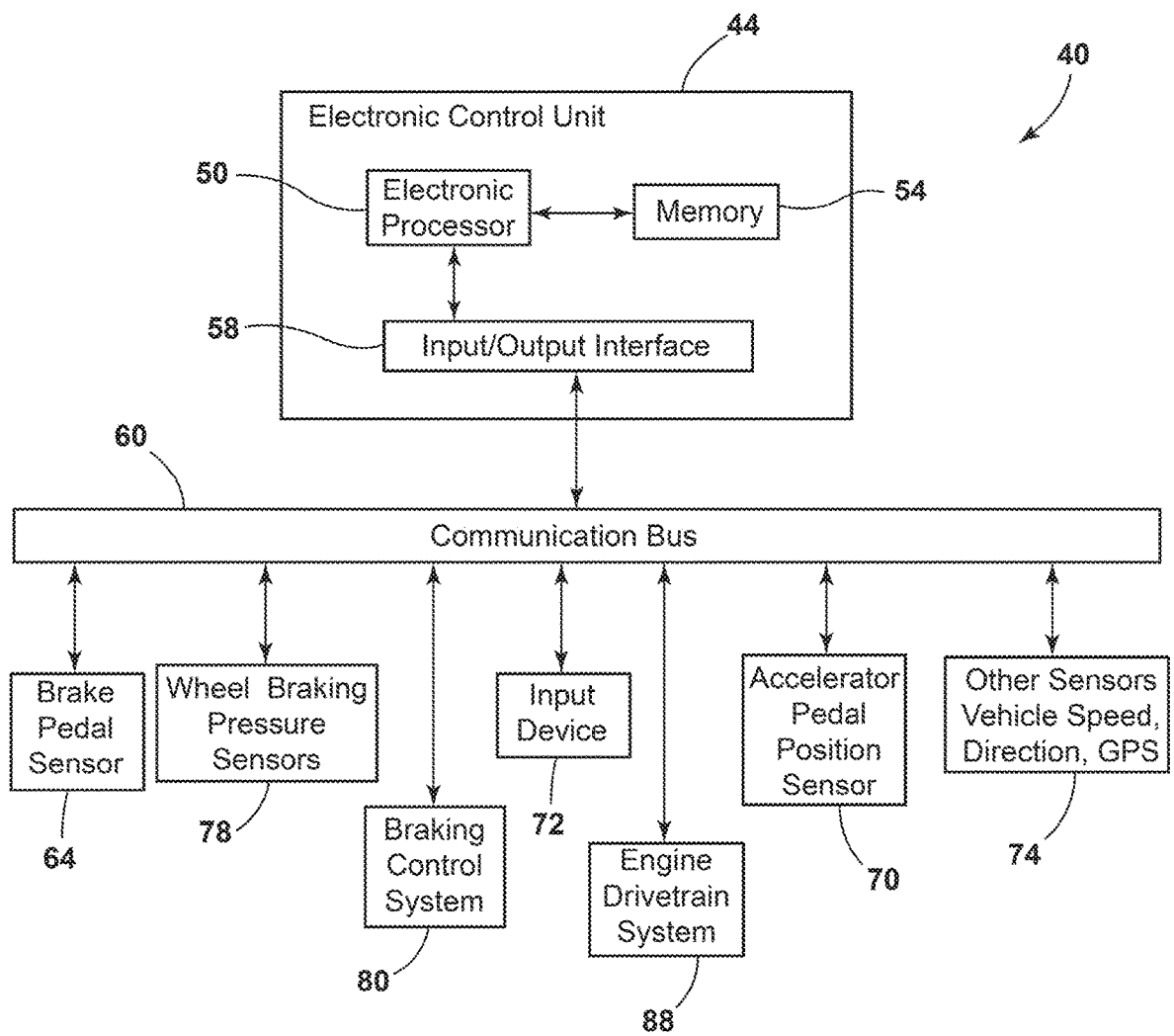
FIG. 1 illustrates a block diagram of one embodiment of a vehicle hill descent system for hill descent control of a vehicle.

FIG. 1 shows a block diagram view of a vehicle hill descent control system 40 for controlling vehicle hill descent. In one embodiment, the vehicle hill descent control system 40 includes an electronic control unit 44. The electronic control unit 44 includes an electronic processor 50 and a memory 54. The memory 54 includes one or more memory modules, such as a random access memory ("RAM") and an electronically erasable programmable read-only memory ("EEPROM"). An input/output interface 58 transmits and receives information over a communication bus 60. The electronic processor 50 processes the information by executing one or more applications or modules. The applications or modules can be stored as instructions or commands in the memory 54. The electronic processor 50 also stores information in the memory 54 generated by applications.

The communication bus 60 shown in FIG. 1 is a FlexRay automotive communication bus, controller area network (CAN) bus or other type of communication link between a plurality of control units, sensors, and other devices. In some embodiments, the communication bus 60 connects the electronic control unit 44 to a brake pedal sensor 64 that senses or provides a position of the brake pedal. An accelerator pedal position sensor 70 is connected to the communication bus 60 to provide an accelerator pedal position to the electronic control unit 44. An input device 72, such as a touchscreen, is provided in a vehicle interior to receive inputs from a user and to display information. In another embodiment, the input device 72 is a push button for receiving a manual input from a user to actuate the system and enter a vehicle hill descent mode.

Further, FIG. 1 shows other sensors and information 74, such as global positioning signal (GPS) information, vehicle speed and direction information that is provided to the electronic control unit 44 via the communication bus 60 in some embodiments.

FIG. 1 also shows wheel braking pressure sensors 78 that provide brake pressure or braking torque information to the electronic control unit 44 via the communication bus 60 in some embodiments.

FIG. 1 also shows a braking control system 80 for controlling vehicle brakes, and an engine drivetrain system 88 from controlling a vehicle engine. In various embodiments, the electronic control unit 44 connected to the communication bus 60 provides control signals to the systems 80, 88 via the communication bus.

Operation

Figure 2:
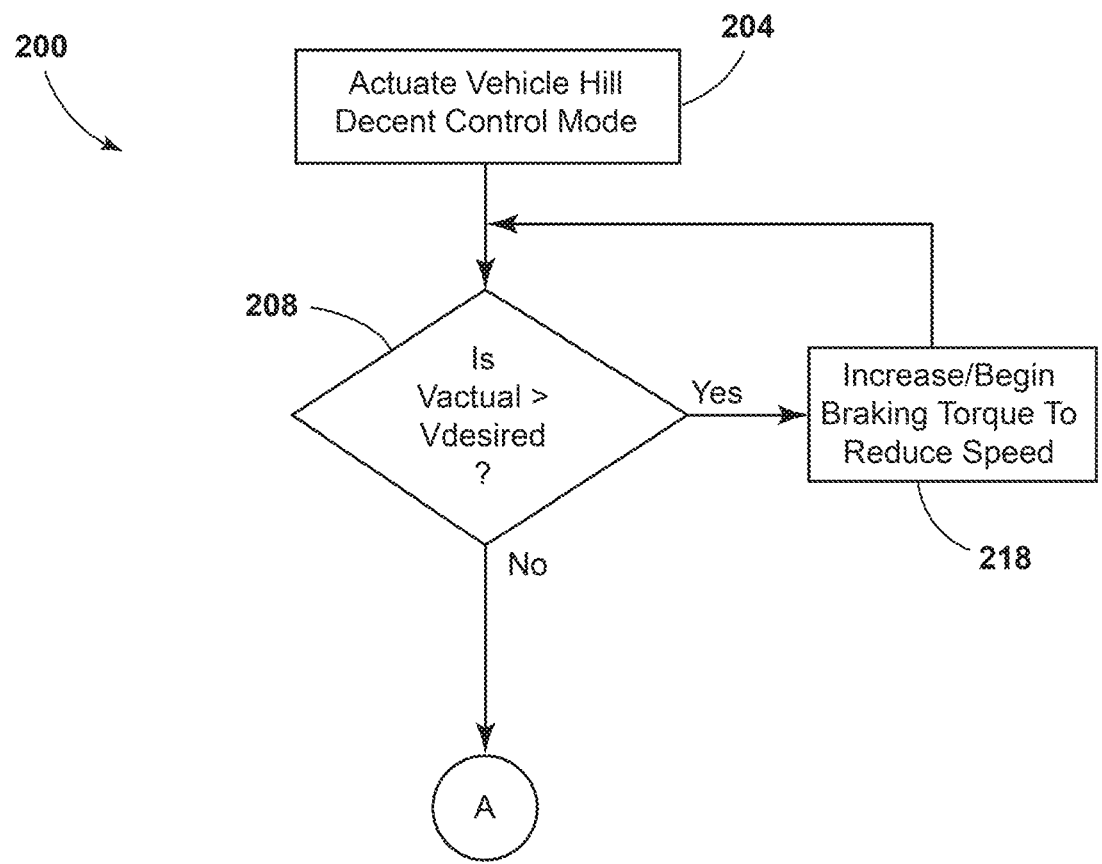
FIG. 2 illustrates a flow chart for an embodiment with beginning actuation of the vehicle hill descent mode.
Figure 3:
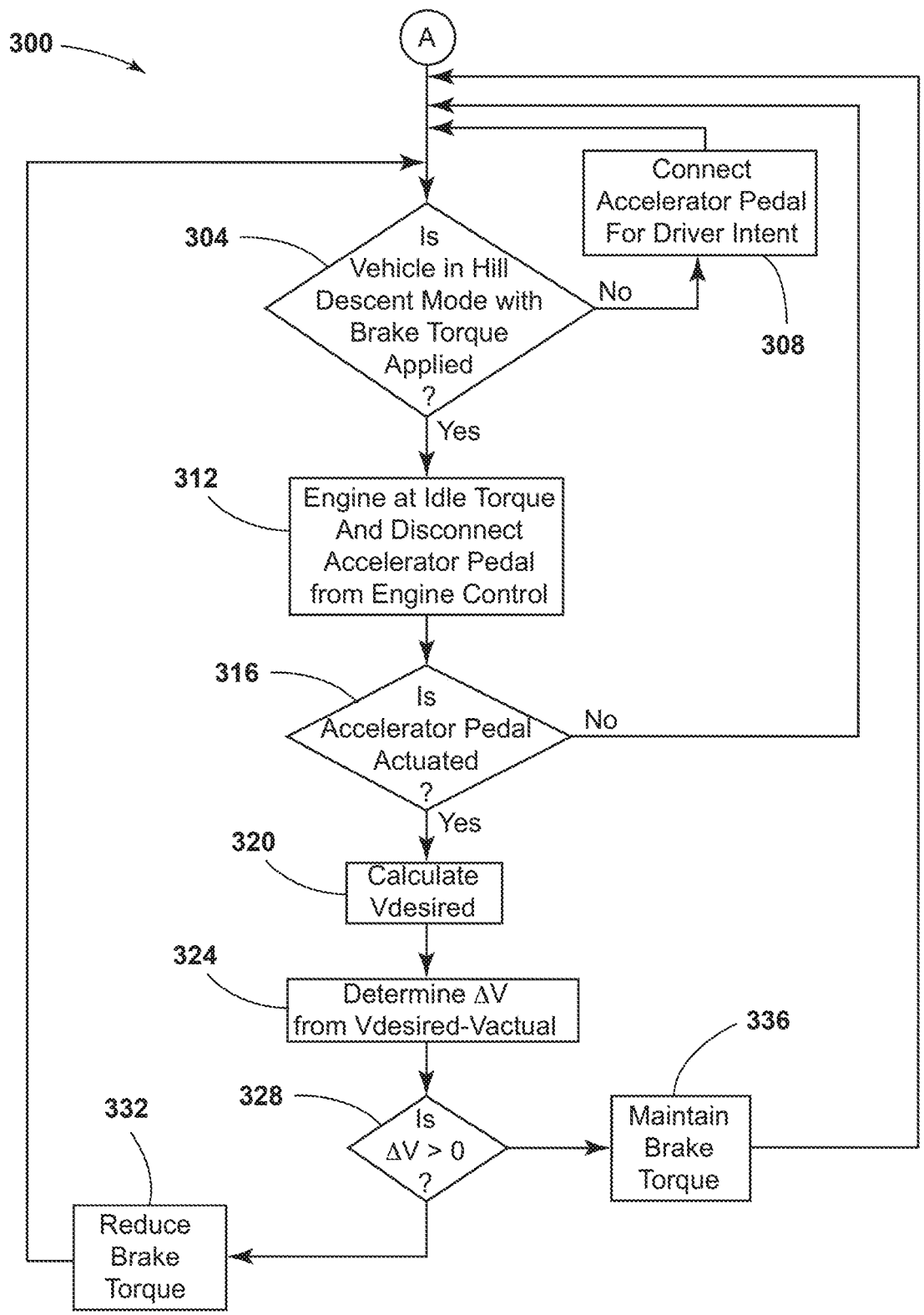
FIG. 3 illustrates a flow chart for an embodiment with accelerator pedal actuation in the vehicle hill descent mode.
Figure 4:
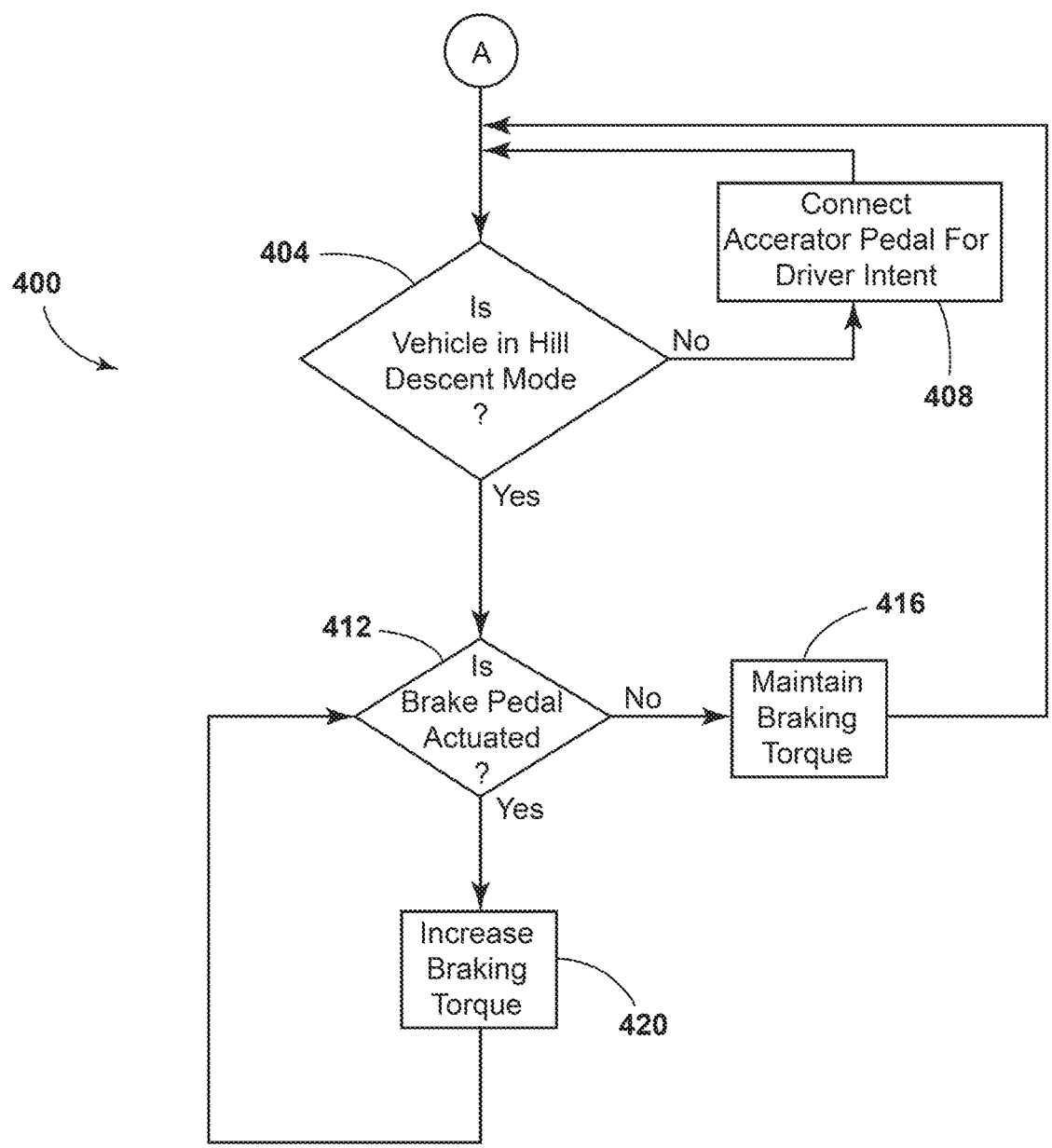
FIG. 4 illustrates a flow chart for an embodiment with brake actuation in the vehicle hill descent mode.

FIGS. 2-4 show flow charts of the operation of the electronic control unit 44 shown in FIG. 1. While a single electronic control unit 44 is shown in FIG. 1, multiple control units and/or electronic processors can perform the various functions shown in FIGS. 2-4. While FIGS. 2-4 show multiple operations or steps, not necessarily all of the operations are required. Further, the multiple steps can occur essentially simultaneously or in parallel with multiple electronic processors.

FIG. 2 is directed to a flow chart 200 showing initial operation of the vehicle hill descent control system 40. At actuation step 204, in one embodiment, a vehicle user driving down a mountain or hill actuates the input device 72 to select the vehicle hill descent control mode. This mode is similar to a cruise control mode in that the intent of the vehicle is to maintain a constant desired speed ($V_{desired}$) after selection.

In another embodiment, vehicle hill descent mode is automatically entered in response to a signal from a gyroscope or other sensor. In one embodiment, a global positioning system (GPS) determines location and direction of the vehicle, and looks up a slope or grade for the road surface from a stored database to automatically enter the vehicle hill descent mode. An indication is displayed on a vehicle dashboard or touchscreen to inform the vehicle operator that the vehicle hill descent mode is selected. In another embodiment, similar information can be used to exit the vehicle hill descent mode.

At decision step 208 shown in FIG. 2, the electronic processor 50 compares an actual vehicle speed ($V_{actual}$) with the desired speed or velocity ($V_{desired}$). Due to the slope of the hill or mountain, the vehicle gains speed, even when the vehicle engine is idling. When the actual speed is greater than desired speed, the electronic processor advances to step 218.

At step 218, the electronic processor 50 provides a signal over the communication bus 60 to the braking control system 80 requesting additional braking torque or pressure to slow the downhill speed of the vehicle and returns to decision step 208. The electronic repeats the comparison of actual vehicle speed and desired vehicle speed provides additional braking torque as needed until the actual speed is no longer greater than the desired speed or velocity. Thereafter, the electronic processor 50 executing a computer program advances to input A in FIG. 3 and/or FIG. 4. The subroutines or algorithms shown in FIGS. 3 and 4 are executed in parallel in some embodiments. With no actuation of a brake pedal or accelerator pedal, the vehicle operates to maintain the vehicle speed at an essentially constant value.

Accelerator Pedal Control

The accelerator pedal actuation subroutine 300 shown in FIG. 3 for the vehicle hill descent mode includes a decision step 304 for determining whether the vehicle is in vehicle hill descent mode with braking torque applied. If not, the electronic processor 50 advances to step 308 and connects the accelerator pedal to the engine drivetrain system, in the instance that the accelerator pedal is not already in communication to power the engine. The electronic processor returns to decision step 304. Thus, no vehicle control occurs in the subroutine 300 of FIG. 3 when the vehicle is in vehicle hill descent mode unless brake torque is applied to limit the actual velocity of the vehicle to the desired velocity.

When the electronic processor 50 determines that the vehicle is in vehicle hill descent mode with braking torque applied at decision step 304, the subroutine advances to step 312. At step 312, the electronic processor 50 provides a signal to the engine drivetrain system 88 to operate the engine at idle torque and to disconnect the accelerator pedal from engine control. Thus, the engine operates at idle torque. The electronic processor 50 advances to decision step 316.

At decision step 316, the electronic processor 50 determines whether the accelerator pedal position sensor 70 has detected movement of the accelerator pedal. If no movement is detected, the electronic processor 50 returns to decision step 304 and the subroutine 300 begins again. When the accelerator pedal position sensor 70 detects movement of the accelerator pedal at step 316, the electronic processor 50 advances to step 320 and determines a desired speed ($V_{desired}$) that is increased depending on the amount of depression of the accelerator pedal. Then the electronic processor 50 advances to step 324.

At step 324, the electronic processor 50 determines change in velocity ($\Delta V$) from $V_{desired} - V_{actual}$. Thereafter, the electronic processor 50 advances to decision step 328.

At step 328, the electronic processor 50 determines whether the change in velocity $\Delta V$ is greater than zero. If so, the electronic processor 50 advances to step 332. At step 332, the electronic processor 50 is configured to provide a control signal to the braking control system 80 over the communication bus 60 to reduce braking torque. The reduction of braking torque necessarily increases the vehicle speed toward the desired speed $V_{desired}$.

From step 332, the electronic processor returns to decision step 304 and will repeat the steps 312, 316, 320, 324 until change of velocity $\Delta V$ is zero or negative at decision step 328. When $\Delta V$ is zero or negative at decision step 328, the electronic processor 50 is configured to advance to step 336.

At step 336, the electronic processor 50 provides a control signal to the braking control system 80 over the communication bus 60 to maintain braking torque and thus maintain the present actual and desired speed of the vehicle.

While not illustrated in FIG. 3, in one embodiment, when the accelerator pedal is depressed a predetermined amount of depression that is greater than 45% or more of maximum pedal movement, the electronic processor 50 is configured to exit the vehicle hill descent mode and returns to normal operation. After exiting, the vehicle hill descent mode must then be re-entered, determined, or selected when needed.

Brake Pedal Control

The brake pedal control subroutine 400 shown in FIG. 4 for the vehicle hill descent mode includes a decision step 404 for determining whether the vehicle is in vehicle hill descent mode with braking torque applied. If not, the electronic processor 50 advances to step 408 and connects the accelerator pedal to the engine drivetrain system, in the instance that the accelerator pedal is not already in communication to power the engine. The electronic processor 50 returns to decision step 404. Thus, no vehicle control occurs in the subroutine 400 of FIG. 4 when the vehicle is not in vehicle hill descent mode. In another embodiment, when the vehicle is not in the vehicle hill descent mode, the electronic processor 50 exits the subroutine 400 entirely, as the vehicle is operating in a normal operating mode.

When the electronic processor 50 determines at decision step 404 that the vehicle is operating in vehicle hill descent mode, the subroutine advances to decision step 412. At decision step 412, the electronic processor 50 determines whether the brake pedal is actuated. If the brake pedal is released or not actuated, the electronic processor advances to step 416. At step 416, the electronic processor 50 maintains braking torque unchanged. In some embodiments, step 416 is not provided as the braking torque is already being maintained. The electronic processor 50 then returns to step 404.

When the electronic processor 50 determines at decision step 412 that the brake pedal is actuated, the subroutine advances to step 420. At step 420 the electronic processor 50 provides a braking control signal to the braking control system 80 over the communication bus 60 to increase the braking torque to reduce vehicle speed. Thereafter, the electronic processor 50 returns to decision step 420. So long as the brake pedal is actuated, steps 412, 420 repeat and increase the braking torque to slow the vehicle speed. When the brake is no longer actuated, the braking torque is maintained at the previous pressure level or amount of braking torque and the vehicle operates at the slower essentially constant value for vehicle speed or velocity.

EXAMPLE

Figure 5:
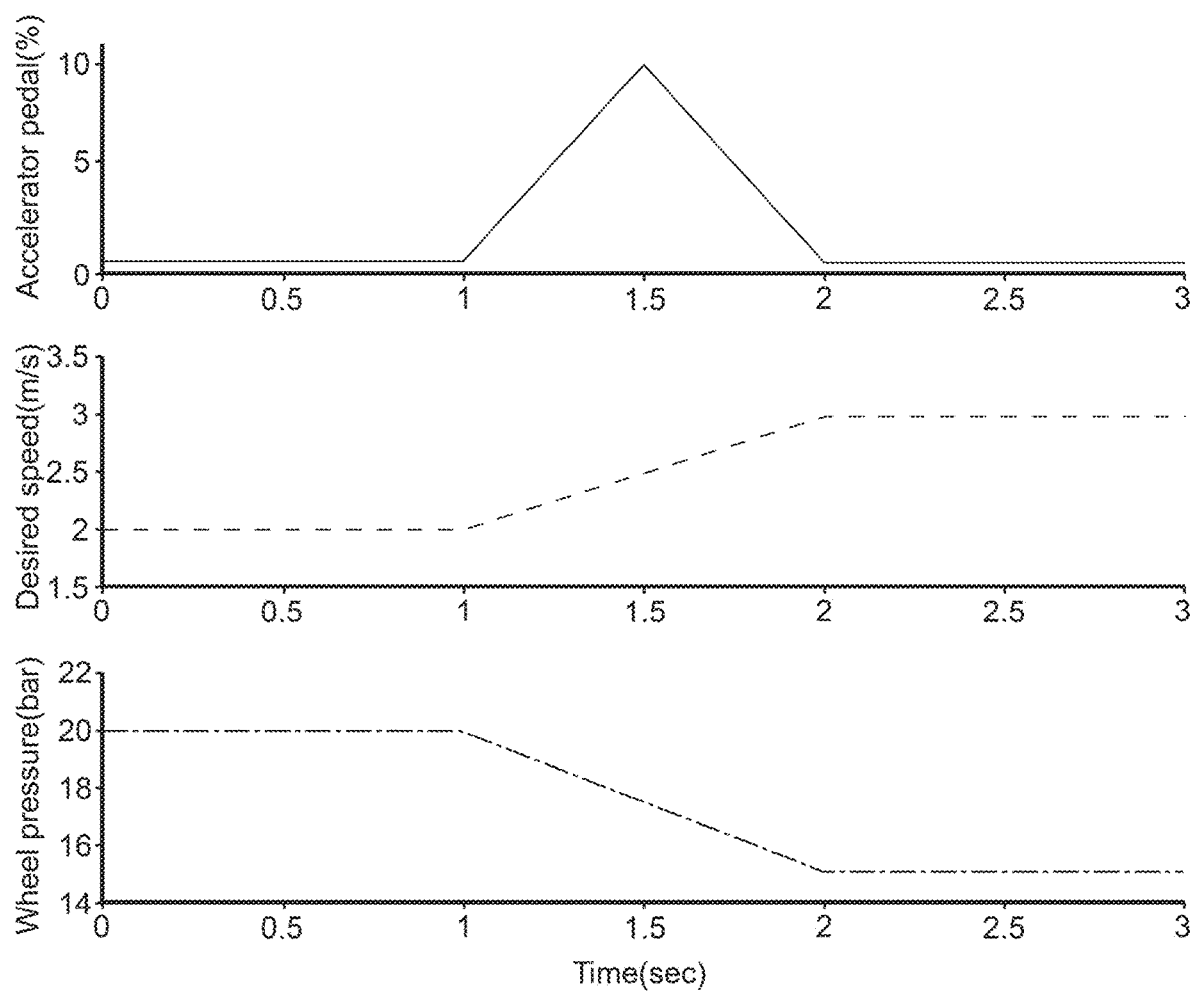
FIG. 5 illustrates a graph of throttle position, desired speed, and wheel braking pressure for a vehicle operating in the vehicle hill descent mode.

FIG. 5 illustrates an operation of the vehicle hill descent control system 40 as shown in FIG. 3. The vehicle is operating in the vehicle hill descent mode with the throttle or accelerator pedal idling and a wheel or brake pressure/torque of 20 bar applied. The vehicle is driving at a desired speed of 2 meters/second.

At time 1 shown in FIG. 5, a vehicle user actuates the accelerator pedal toward about 10% of travel. As shown in FIG. 3, a desired velocity is calculated and the braking torque is reduced. During operation of the throttle from time 1 to time 2 in FIG. 5, the wheel pressure or torque decreases from about 20 bar to about 15 bar. At the same time, the speed increases from about 2 meters/second to about 3 meters/second. At time 2, when the accelerator pedal or throttle is disengaged, the electronic processor 50 operates the vehicle at a constant desired speed of 3 meters/second thereafter.

Figure 6:
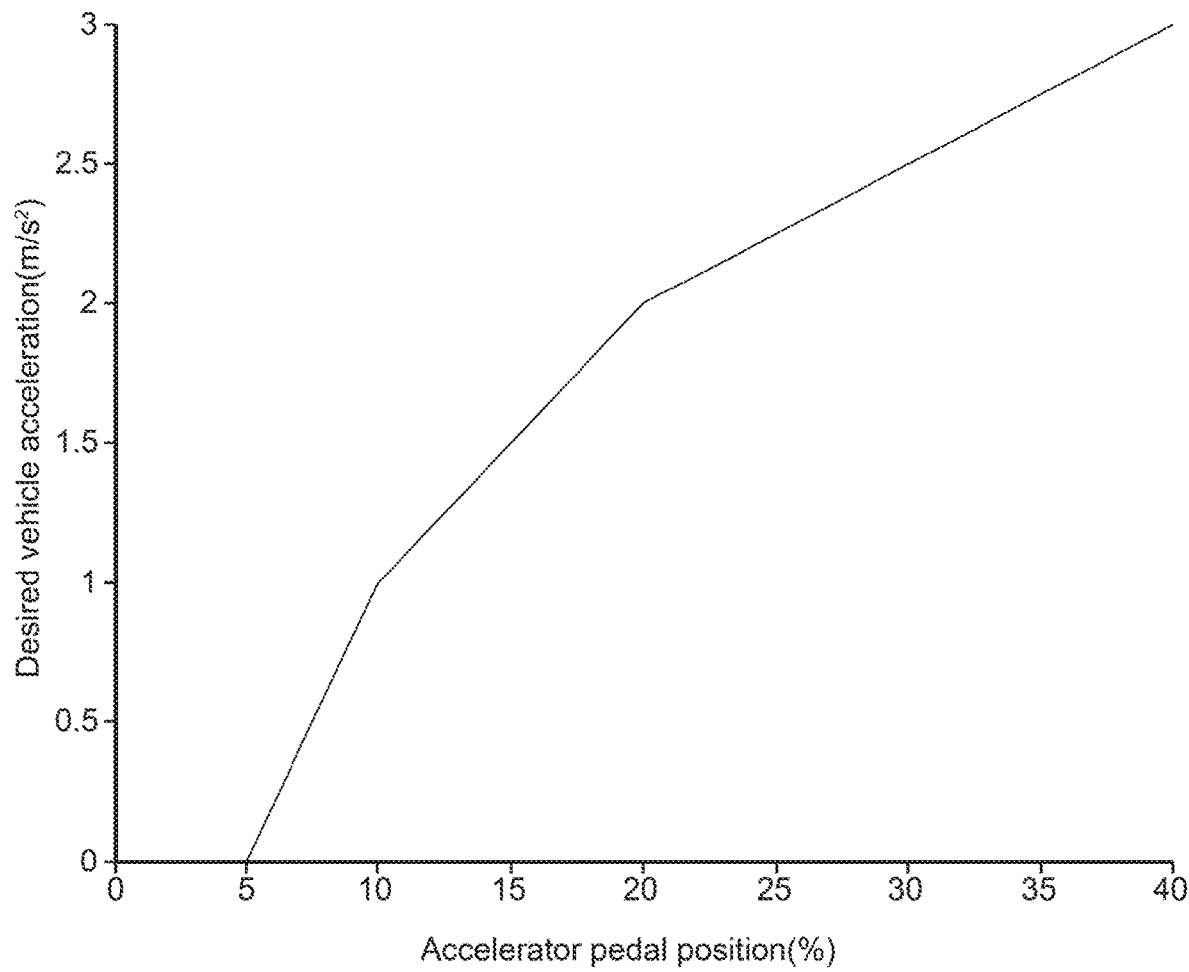
FIG. 6 shows a graph for determining a desired vehicle speed/acceleration in the vehicle hill descent mode based on a throttle position of a throttle or acceleration pedal.

FIG. 6 shows how depression of the accelerator pedal will accelerate the vehicle in the vehicle hill descent mode at an acceleration rate corresponding to the amount of depression of the accelerator pedal. a_desired is a function of accelerator positon as seen in FIG. 6.

With regard to FIGS. 5 and 6, a new desired speed calculation is based on accelerator pedal position applied %.

$$v\_desired = v\_actual + (a\_desired \times dt)$$

In the above equation, v_desired is desired vehicle speed and v_actual is actual vehicle speed. a_desired is the desired acceleration taken from FIG. 6 and dt is the time cycle of the control system.

Engine Idle Torque

Engine idle torque is discussed at step 312 in FIG. 3. In one embodiment, engine idle torque is reduced as follows. In one embodiment, when in the vehicle hill descent mode with braking torque applied, the engine of the vehicle is suppressed as follows.

Vehicle torque is requested to be reduced as per a ramp down parameter (torque/sec) till it is as idle as defined by the equation $\tau\_desired = \tau\_actual - (d\tau \times dt)$.

In this equation, $\tau\_desired$ is desired engine torque, $\tau\_actual$ is actual engine torque, $d\tau$ is the ramp down parameter (torque/sec), and dt is the time cycle of the control system, such as the electronic processor 50 executing an algorithm to reduce engine torque.

Various features, advantages, and embodiments are set forth in the following claims.

What is claimed is:

1. A vehicle hill descent control system for controlling speed of a vehicle with an engine, the system comprising:
    an accelerator pedal position sensor for sensing position of an accelerator pedal;
    a braking control system;
    an engine drivetrain system;
    a brake pedal sensor;
    a vehicle speed and direction sensing arrangement; and
    an electronic control unit including an electronic processor and a memory, wherein the electronic processor is configured to:
        determine that the vehicle is in a vehicle hill descent mode with braking torque applied to control speed of the vehicle, and thereafter to:
        operate the engine at idle torque and disconnect the accelerator pedal position sensor from the engine to maintain the idle torque;
        when the accelerator pedal is actuated, determine a desired velocity for the vehicle corresponding to the position of the accelerator pedal;
        provide a control signal to the braking control system to reduce the braking torque of the vehicle to increase velocity of the vehicle; and
        when the desired velocity for the vehicle is obtained, maintain the braking torque at a constant value.

2. The vehicle hill descent control system according to claim 1, wherein a manual input device is manually actuated to enter the vehicle hill descent mode.

3. The vehicle hill descent control system according to claim 1, wherein the electronic processor is configured to automatically enter the vehicle hill descent mode in response to a signal from a gyroscope or other sensor.

4. The vehicle hill descent control system according to claim 1, wherein the electronic processor is configured to provide an indication on a vehicle dashboard or touchscreen that the vehicle is in the vehicle hill descent mode.

5. The vehicle hill descent control system according to claim 1, wherein the electronic processor is configured to maintain the desired velocity at essentially a constant value when the accelerator pedal is not depressed.

6. The vehicle hill descent control system according to claim 1, wherein the electronic processor is configured to accelerate the vehicle when the accelerator pedal is depressed in the vehicle hill descent mode at an acceleration rate corresponding to the amount of depression of the accelerator pedal.

7. The vehicle hill descent control system according to claim 1, wherein the electronic processor is configured to exit the vehicle hill descent mode when the accelerator pedal is depressed a predetermined amount that is greater than 45% of maximum pedal movement.

8. The vehicle hill descent control system according to claim 1, including a communication bus connecting the electronic control unit including the electronic processor to the braking control system and the engine drivetrain system.

9. The vehicle hill descent control system according to claim 2, including increasing the braking torque when a brake pedal is actuated in the vehicle hill descent mode and maintaining the braking torque when the brake pedal is released in the vehicle hill descent mode.

10. The vehicle hill descent control system according to claim 2, wherein the electronic processor is configured to maintain the desired velocity at essentially a constant value when the accelerator pedal is not depressed.

11. A method for controlling speed of a vehicle with an engine, the method comprising:
determining that the vehicle is in a vehicle hill descent mode with braking torque applied to vehicle brakes to control speed of the vehicle, when in the vehicle hill descent mode:
operating the engine at idle torque and disconnecting an accelerator pedal position sensor from the engine to maintain the idle torque;
when an accelerator pedal is actuated in the vehicle hill descent mode:
determining a desired velocity for the vehicle corresponding to the position of the accelerator pedal;
providing a control signal to a braking control system to reduce the braking torque of the vehicle and increase velocity of the vehicle; and
when the desired velocity for the vehicle is obtained, maintaining the braking torque at a constant value.

12. The method according to claim 11, including manually actuating an input device to enter the vehicle hill descent mode.

13. The method according to claim 11, including automatically entering the vehicle hill descent mode in response to a signal from a gyroscope or other sensor.

14. The method according to claim 11, including providing an indication on a vehicle dashboard or touchscreen that the vehicle is in the vehicle hill descent mode.

15. The method according to claim 11, including maintaining the desired velocity at essentially a constant value when the accelerator pedal is not depressed.

16. The method according to claim 11, including accelerating the vehicle when the accelerator pedal is depressed in the vehicle hill descent mode at an acceleration rate corresponding to an amount of depression of the accelerator pedal.

17. The method according to claim 11, including exiting the vehicle hill descent mode when the accelerator pedal is depressed a predetermined amount that is greater than 45% of maximum pedal movement.

18. The method according to claim 11, including a communication bus connecting an electronic control unit including an electronic processor to a braking control system and an engine drivetrain system of the vehicle.

19. The method according to claim 11, including increasing the braking torque when a brake pedal is actuated in the vehicle hill descent mode and maintaining the braking torque when the brake pedal is released in the vehicle hill descent mode.

20. The method according to claim 12, including maintaining the desired velocity at essentially a constant value when the accelerator pedal is not depressed.

* * * * *